United States Patent
Gulaguli et al.

(10) Patent No.: US 10,970,643 B2
(45) Date of Patent: Apr. 6, 2021

(54) ASSIGNING A FIRE SYSTEM SAFETY SCORE AND PREDICTIVE ANALYSIS VIA DATA MINING

(71) Applicant: Honeywell International Inc., Morristown, NJ (US)

(72) Inventors: Shashikant Gulaguli, Bangalore (IN); Balamurugan Venkatesh, Hosur (IN); Mahadevan Somasundram Balakrishnan, Chennai (IN)

(73) Assignee: Honeywell International Inc., Charlotte, NC (US)

( * ) Notice: Subject to any disclaimer, the term of this patent is extended or adjusted under 35 U.S.C. 154(b) by 997 days.

(21) Appl. No.: 15/092,258

(22) Filed: Apr. 6, 2016

(65) Prior Publication Data
US 2017/0293852 A1    Oct. 12, 2017

(51) Int. Cl.
 *G06N 7/00*  (2006.01)
 *G06Q 10/06*  (2012.01)
 *G06N 20/00*  (2019.01)
 *G01N 21/94*  (2006.01)

(52) U.S. Cl.
CPC ............. *G06N 7/005* (2013.01); *G01N 21/94* (2013.01); *G06N 20/00* (2019.01); *G06Q 10/06* (2013.01)

(58) Field of Classification Search
CPC ......... G06Q 10/06; G06N 7/005; G01N 21/94
See application file for complete search history.

(56) References Cited

U.S. PATENT DOCUMENTS

| | | |
|---|---|---|
| 7,227,450 B2 | 6/2007 | Garvey et al. |
| 9,857,301 B1* | 1/2018 | Nourbakhsh ...... G01N 33/0062 |
| 2003/0234732 A1* | 12/2003 | Rhodes ................. G08B 17/10 340/870.16 |
| 2006/0010388 A1* | 1/2006 | Imhof .................... G05B 15/02 715/734 |
| 2007/0208438 A1* | 9/2007 | El-Mankabady ...... G05B 15/02 700/83 |
| 2009/0048781 A1* | 2/2009 | Chan ..................... G01D 21/02 702/2 |
| 2012/0011559 A1 | 1/2012 | Miettinen et al. |
| 2012/0123806 A1 | 5/2012 | Schumann, Jr. et al. |
| 2015/0378715 A1* | 12/2015 | Solnit .................... G08B 17/10 717/168 |
| 2017/0180829 A1* | 6/2017 | Schwarzkopf ........... H04Q 9/00 |

OTHER PUBLICATIONS

Camuffo, Dario et al., "Environmental Monitoring in Four European Museums", Atmospheric Environment 35 Supplement No. 1 (2001), pp. S127-S140. (Year: 2001).*
Proietti, Andrea et al., "Dust Detection and Analysis in Museum Environment Based on Pattern Recognition", Measurement 66 (2015), pp. 62-72. Available online Feb. 7, 2015. (Year: 2015).*
Extended European search report from corresponding EP patent application 17162974.4, dated May 11, 2017.

* cited by examiner

*Primary Examiner* — Scott A. Waldron
(74) *Attorney, Agent, or Firm* — Brooks, Cameron & Huebsch, PLLC

(57) ABSTRACT

Systems and methods for assigning or computing a fire system safety score via data mining and for predictive analysis via data mining are provided. Some methods can include identifying one or more pieces of data information from an ambient condition monitoring system installed in a region, quantifying the one or more pieces of the data information, and identifying a safety score of the region based on the quantified one or more pieces of the data information.

14 Claims, 1 Drawing Sheet

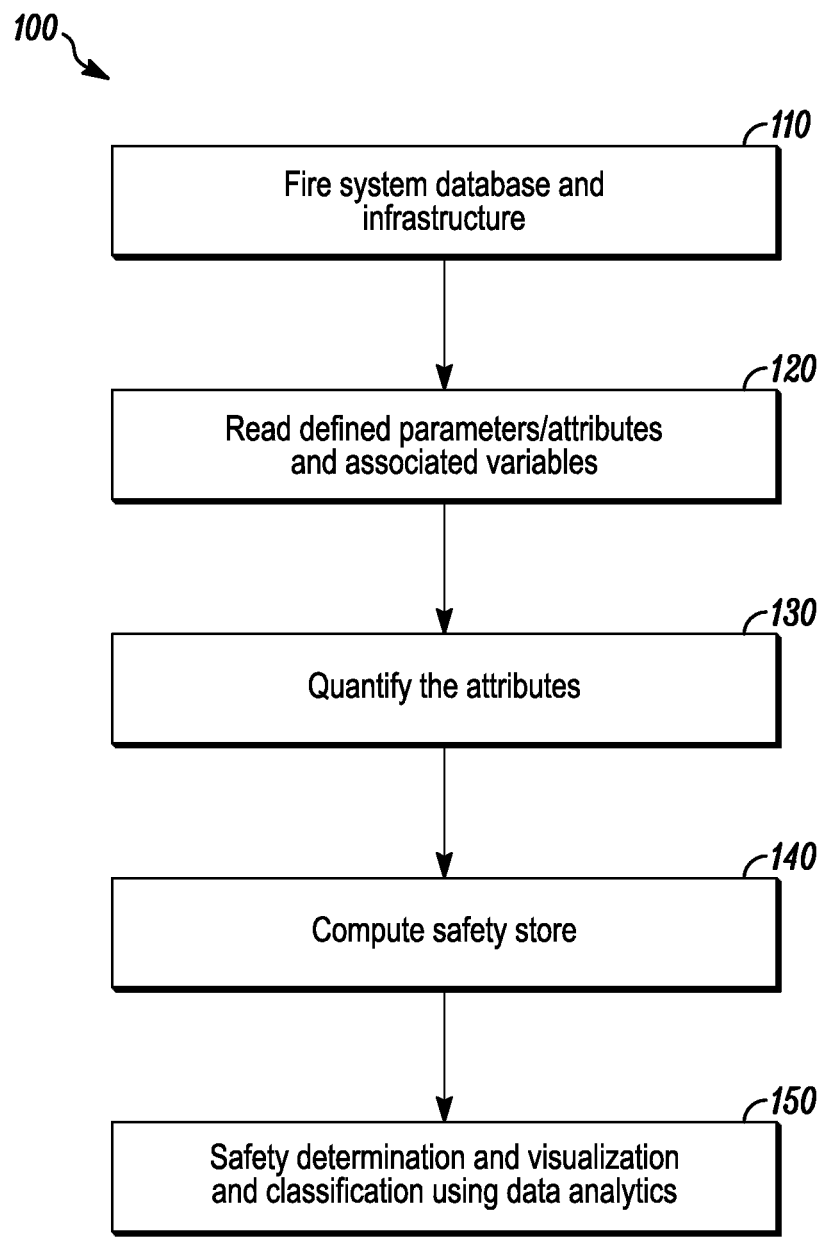

ASSIGNING A FIRE SYSTEM SAFETY SCORE AND PREDICTIVE ANALYSIS VIA DATA MINING

FIELD

The present invention relates generally to fire systems and methods. More particularly, the present invention relates to systems and methods for assigning a fire system safety score and for predictive analysis via data mining.

BACKGROUND

In known fire systems, the occupation safety level, which indicates how safe a monitored region is in terms of fire detection and notification systems, is an unknown factor to managers and occupants of the region. Furthermore, known fire systems do not provide a user interface to visually communicate any such safety level in a way that can be interpreted by a user. Indeed, when the occupation safety level of a region needs to be enhanced, there are no known systems and methods for predicting operational and functional behaviors of the fire system to assist in such enhancement.

In view of the above, there is a continuing, ongoing need for improved systems and methods.

BRIEF DESCRIPTION OF THE DRAWINGS

FIG. 1 is a flow diagram of a method in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for assigning or computing a fire system safety score via data mining. For example, in accordance with disclosed embodiments, systems and methods can include a data analytics engine that can retrieve a set of data information from detection and notification components of a fire system, aggregate and analyze the retrieved data information, and based thereon, assign or compute an occupancy safety score (OSS) for the fire system. That is, systems and methods disclosed herein can quantify the safety of a fire system in a monitored region based on, at least, the occupation characteristics and functional operation distribution of the system and the region.

In some embodiments, the data information provided by detection and notification components of the fire system can include, but is not limited to, information related to the fire system's component's attributes, including, but not limited to, point labels, point types, detection device obscuration levels, point status history, occupancy behavior, software version incompatibility, and fire system trouble status and information related to the fire system's associated failures, including, but not limited to, corrupted configuration databases, hardware errors, secondary power circuit health, third party system interfaces to the fire system, and the like.

Embodiments disclosed herein can also include systems and methods for predictive analysis via data mining. For example, in accordance with disclosed embodiments, systems and methods can include a logical analytical engine that can map the data information provided by detection and notification components of the fire system to a map of the monitored region, and based thereon, predict operational and functional behaviors of the fire system. That is, systems and methods disclosed herein can provide predictive guidance through trending mechanisms, which can be used to enhance occupation safety.

In some embodiments, the systems and methods disclosed herein can graphically or visually display on a user interface the assigned or computed OSS for the fire system. In some embodiments, the systems and methods disclosed herein can dynamically display the assigned or computed OSS, which may change as attributes and components of the fire system change. In some embodiments, the systems and methods disclosed herein can display the assigned or computed OSS, or an associated level thereof, for different portions of the fire system on a map of the monitored region. In accordance with the above, systems and methods disclosed herein can provide a safety metrics system and identify when the safety of a fire system or region needs improvement.

Systems and methods disclosed herein are described in connection with a fire system. However, it is to be understood that embodiments disclosed herein are not so limited and can include, but are not limited to, any ambient condition monitoring or detection system as would be known by one of ordinary skill in the art.

FIG. 1 is a flow diagram of a method 100 in accordance with disclosed embodiments. As seen in FIG. 1, the method 100 can include providing a fire system database and infrastructure as in 110 and identifying or obtaining data information related to defined attributes or parameters and associated variables from the fire system database and infrastructure as in 120. The method 100 can also include quantifying the data information related to the attributes as in 130, computing a safety score as in 140, and displaying a visual representation of the safety score or of a safety determination or classification based on the safety score as in 150.

In accordance with the above, the safety score can be computed in accordance with Equation 1.

$$\text{Safety score}=fn(\text{attribute 1,variable 1,attribute 2,variable 2, \ldots attribute } n\text{,variable } n) \quad \text{Equation 1}$$

That is, the safety score can be quantified as a function of each attribute of the fire system database and infrastructure, and each attribute can vary according to variables associated with that attribute.

In accordance with disclosed embodiments, each attribute of the fire system database and infrastructure can have predetermined weightage points associated therewith. For example, the weightage points associated with an attribute can be based on the impact that attribute has on the fire system. Accordingly, attributes with a greater impact on the fire system can have a higher number of weightage points associated therewith, and attributes with a lower impact on the fire system can have a lower number of weightage points associated therewith.

In some embodiments, a safety score can be computed for particular areas in a region based on the attributes of the respective region. In these embodiments, the safety scores for all areas in the region can be aggregated to arrive at an overall safety score for the region. When viewing the visual representation of the safety score or the safety determination or classification based on the safety score, a user can view the safety score, determination, or classification for the whole region, for particular areas in the region, or for particular levels in the region, for example, floor levels, hallway levels, or occupancy levels. It is to be understood that each level can include one or more region.

In an exemplary embodiment, when a fire system loop in a fire system fails, all input and output points in the loop are unavailable in the system. In known systems and methods, a fire control panel indicates the non-functional activity of the fire system loop as system trouble. However, known systems and methods fail to identify or visualize the impact of the failed fire system loop on occupation safety in the region monitored by the fire system. Accordingly, systems and methods disclosed herein can process and analyze the failed fire system loop to identify a safety score and display a visual representation thereof. For example, some systems and methods disclosed herein can identify an attribute of the fire system to be the fire system loop and a variable associated therewith to be failed and can calculate the safety score as a function of the failed fire system loop. In some embodiments, the visual representation of the safety score can include a safety determination or classification based thereon that can, for example, identify floors or areas of monitored region impacted by the safety score.

In another exemplary embodiment, some occupancy areas in a region monitored by a fire system can be more or less susceptible to dust, which can lead to faster or slower device obscuration levels or higher or lower thresholds. Systems and methods disclosed herein can process and analyze dust levels in particular occupancy areas in the region to identify a safety score and display a visual representation thereof. For example, some systems and methods disclosed herein can identify an attribute of the fire system to be a dust level, a device obscuration level, or a device threshold level and a variable associated therewith to be a measured amount of dust in a particular occupancy region and can calculate the safety score as a function of the measured amount of dust with respect to the dust level, the device obscuration level, or the device threshold level.

In some embodiments, one or more devices in the fire system can be identified as critical, for example, devices that are part of cross-area configuration. When systems and methods disclosed herein identify a critical device as failing or having a low threshold, systems and methods can identify the critical device as needing immediate maintenance or replacement.

In some embodiments, systems and methods can categorize one or more occupancy areas or zones in a monitored region as being similar to one another or can categorize one or more monitored region as being similar to one another. For example, monitored regions can be identified based on the segment of the market to which they cater, internal characteristics, materials used, or functional operation distribution, for example, a hospital, hotel, retail store, warehouse, or other commercial establishment. Safety scores and the levels thereof for similar occupancy areas or zones or for similar monitored regions can be monitored, benchmarked, and analyzed for trends, and such identified trends can be used over time to enhance the overall safety score of such areas, zones or regions.

It is to be understood that the systems and methods described above can be executed on or controlled by one or more of a control panel of a fire system or a central monitoring station or user device in communication with the control panel. For example, the control panel, central monitoring station, or user device can include a user interface device, a database device, control circuitry, one or more programmable processors, and executable control software as would be understood by those of ordinary skill in the art. The executable control software can be stored on a transitory or non-transitory computer readable medium, including, but not limited to, local computer memory, RAM, optical storage media, magnetic storage media, flash memory, and the like.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
identifying one or more pieces of data information from a fire system installed in a particular occupancy region, wherein the one or more pieces of data information include at least one occupation characteristic attribute selected from the group including: a point label, a point type, a detection device obscuration level, a point status history, an occupancy behavior, a software version incompatibility; and at least one functional operation attribute including a fire system trouble status and information related to the fire system's associated failures, selected from: a corrupted configuration database, a hardware error, a secondary power circuit health condition, a condition of a third party system interface to the fire system;
assigning a weighting value to each selected attribute;
calculating a safety score that is based on, at least, the selected at least one occupation characteristic attribute and the at least one functional operation attribute as a function of the selected attributes and the quantity of the weighting value of each attribute;
and
graphically displaying, via a user interface, a visual representation of the safety score including identifying areas of the particular occupancy region impacted by the safety score.

2. The method of claim 1 wherein identifying the one or more pieces of the data information includes retrieving the one or more pieces of the data information from a database device.

3. The method of claim 1 wherein identifying the one or more pieces of the data information includes retrieving the one or more pieces of the data information from one or more detection devices or notification devices of the fire system.

4. The method of claim 3 further comprising:
mapping each piece of the data information on a map of the particular occupancy region according to the detection device or notification device that provided the piece of the data information; and
responsive to the mapping, predicting operational or functional behaviors of the fire system.

5. The method of claim 1 wherein calculating the safety score includes calculating the safety score as a function of numerical values of a plurality of attributes of the fire system.

6. The method of claim 5 wherein calculating the safety score includes weighting a respective numerical value of the plurality of attributes based on predetermined weight values.

7. The method of claim 1 wherein identifying the safety score of the particular occupancy region includes:
calculating a safety score for each of a plurality of zones within the particular occupancy region; and
aggregating the safety score for each of the plurality of zones within the particular occupancy region to calculate an overall safety score of the particular occupancy region.

8. The method of claim 1 further comprising identifying one or more trends based on the safety score.

9. A system comprising:
a programmable processor; and
executable control software stored on a non-transitory computer readable medium, wherein the programmable processor and the executable control software:
identify one or more pieces of data information from a fire system installed in a particular occupancy region, wherein the pieces of data information include at least one occupation characteristic attribute selected from the group including: a point label, a point type, a detection device obscuration level, a point status history, an occupancy behavior, a software version incompatibility; and at least one functional operation attribute including a fire system trouble status and information related to the fire system's associated failures, selected from: a corrupted configuration database, a hardware error, a secondary power circuit health condition, a condition of a third party system interface to the fire system;
assign a weighting value to each selected attribute;
calculate a safety score that is based on, at least, the selected at least one occupation characteristic attribute and the at least one functional operation attribute as a function of the selected attributes and the quantity of the weighting value of each attribute; and
a user interface device, wherein the programmable processor and the executable control software cause a visual representation of the safety score including identifying areas of the particular occupancy region impacted by the safety score to be displayed on the user interface device.

10. The system of claim 9 further comprising:
a databased device,
wherein the programmable processor and the executable control software retrieve the one or more pieces of the data information from the database device.

11. The system of claim 9 further comprising:
a transceiver in communication with one or more detection devices or notification devices of the fire system,
wherein the programmable processor and the executable control software retrieve the one or more pieces of the data information from the one or more detection devices or notification devices.

12. The system of claim 11, wherein the programmable processor and the executable control software map each piece of the data information on a map of the particular occupancy region according to the detection device or notification device that provided the piece of the data information, and wherein, responsive to the mapping, the programmable processor and the executable control software predict operational or functional behaviors of the fire system.

13. The system of claim 9 wherein the programmable processor and the executable control software weight a respective numerical value of the plurality of attributes based on predetermined weight values.

14. The system of claim 9 wherein the programmable processor and the executable control software calculate a safety score for each of a plurality of zones within the particular occupancy region, and aggregate the safety score for each of the plurality of zones within the particular occupancy region to calculate an overall safety score of the particular occupancy region.

* * * * *